(12) United States Patent
Bach

(10) Patent No.: US 6,647,915 B1
(45) Date of Patent: Nov. 18, 2003

(54) WINDSHIELD EDGE ASSEMBLY AND METHOD

(75) Inventor: Darren A. Bach, North Delta (CA)

(73) Assignee: Malibu Boats West, Inc., Merced, CA (US)

( * ) Notice: Subject to any disclaimer, the term of this patent is extended or adjusted under 35 U.S.C. 154(b) by 0 days.

(21) Appl. No.: 10/177,403

(22) Filed: Jun. 20, 2002

(51) Int. Cl.[7] .............................................. B63B 17/00
(52) U.S. Cl. .................................... 114/361; 296/96.21
(58) Field of Search ...................... 114/361; 296/96.21; 52/208

(56) References Cited

U.S. PATENT DOCUMENTS

| | | |
|---|---|---|
| 2,937,652 A | 5/1960 | Zimmer, Jr. et al. |
| 3,016,548 A | 1/1962 | Taylor |
| 3,021,535 A | 2/1962 | Dorst |
| 3,172,419 A | 3/1965 | Lewis |
| 3,654,648 A | 4/1972 | Wilhoit |
| 3,810,267 A | 5/1974 | Fussell, Jr. et al. |
| 3,978,535 A | 9/1976 | Swan et al. |
| 4,151,620 A | 5/1979 | Heuzonter |
| 4,349,994 A | 9/1982 | Maekawa |
| 4,750,449 A | 6/1988 | Muhlberger |
| 4,815,410 A | 3/1989 | Muhlberger |
| 4,993,351 A | 2/1991 | Zirkelbach et al. |
| D324,368 S | 3/1992 | Zirkelbach et al. |
| 5,189,980 A | 3/1993 | Zirkelbach et al. |
| 5,269,250 A | 12/1993 | Daniels |
| 5,367,977 A * | 11/1994 | Ellis et al. .................. 114/361 |
| 5,601,050 A * | 2/1997 | Erskine et al. .............. 114/361 |
| 2002/0020337 A1 * | 2/2002 | Eck et al. .................... 114/361 |

OTHER PUBLICATIONS

The Loxcreen Company, Inc. die drawing Nos. 9689, 9402, 9264, 7636, 7131 and 4140.
Photographs showing 1964 Century Resorter top edge.

* cited by examiner

Primary Examiner—Jesus D. Sotelo
(74) Attorney, Agent, or Firm—Dorsey & Whitney LLP

(57) ABSTRACT

A windshield edge assembly (31) for stretch forming to fit on the edge (81) of a curved boat windshield. The edge assembly (31) includes an elongated base member (32) having legs defining a windshield receiving channel (34) and a longitudinally extending cap receiving structure (37). An elongated cap member (38) is mounted on the cap receiving structure (37) of the base member (32) and the cap (32) has side edges (51,52) cooperatively formed to interlock with the structure (37) provided on the base member (32) during stretch forming of the combination. A clamping arm (54) is provided on the concaved side (46) of the assembly (31) to clamp against the cap member (38) and capture it in interlocked relation with the base member (32). The cap member (38) is preferably a roll formed stainless steel, while the base member (32) is preferably an extruded aluminum member. A method of stretch forming a curved edge assembly (31) for a boat windshield also is disclosed.

45 Claims, 2 Drawing Sheets

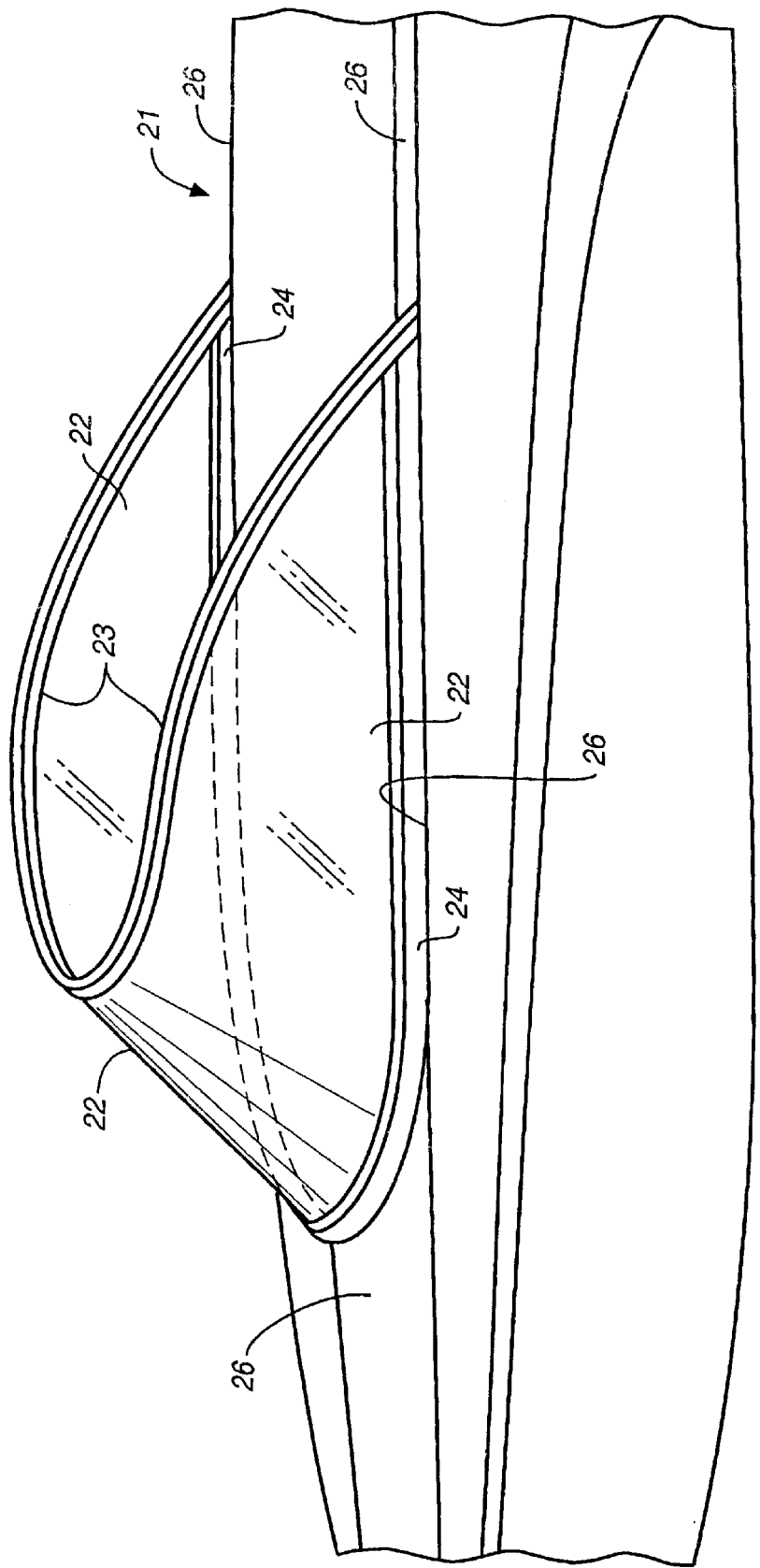
FIG._1

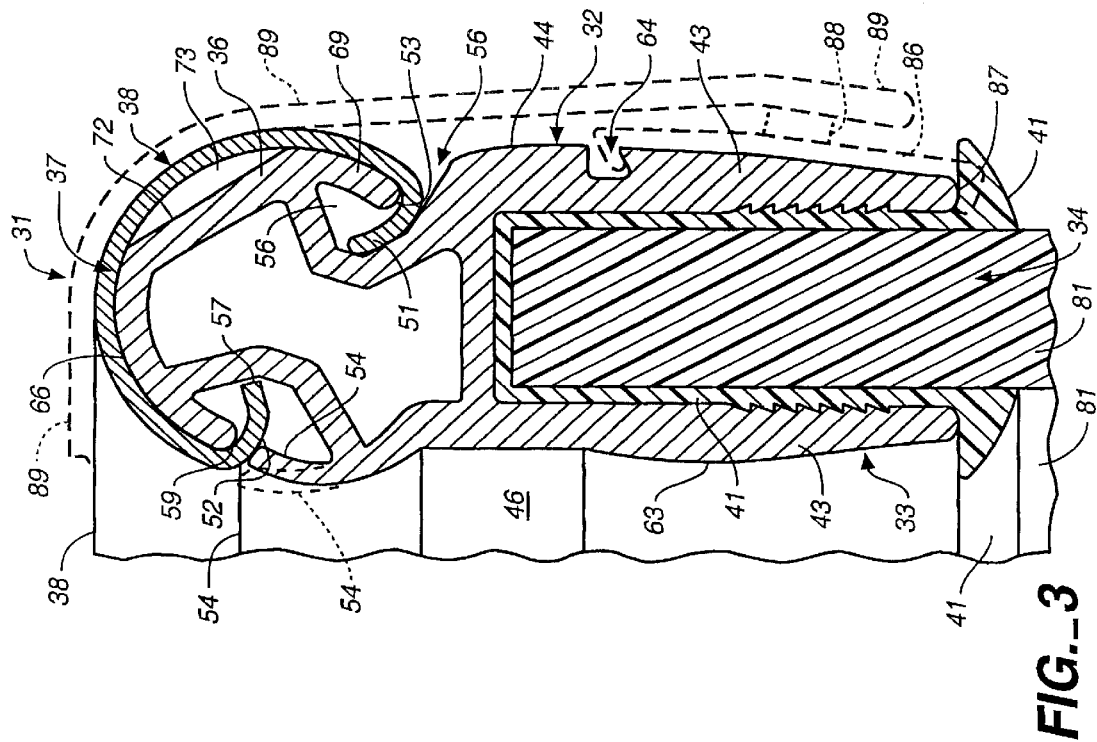
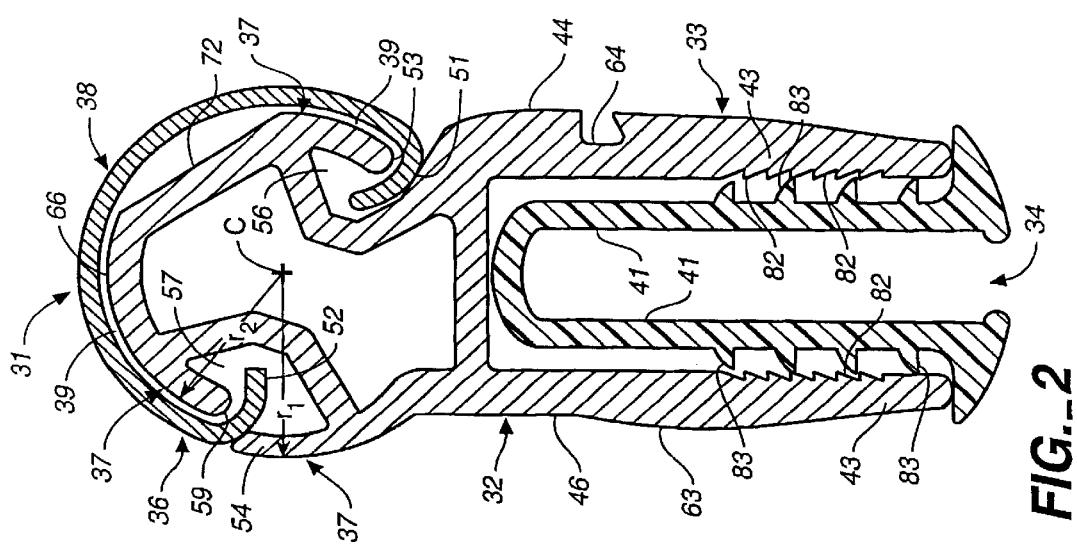

WINDSHIELD EDGE ASSEMBLY AND METHOD

TECHNICAL FIELD

The present invention relates, in general, to edge trim assemblies of the type mounted on boat windshields, and more particularly, to boat windshield top edge extrusions or headers and methods for their formation.

BACKGROUND ART

Trimming or finishing the edges of boat windshields has become more complex over the years as the windshield shapes have progressed from simple rectangular panes to complexly curved and obliquely oriented windshields. The most common approach currently in use is to employ a metal extrusion which is stretch formed on a die to the curved shape of the edge of the windshield glass to be trimmed. Usually the edge trimming extrusion is formed from aluminum and has legs or arms that define a windshield receiving longitudinally extending channel. A gasket, such as a vinyl or thermoplastic gasket, is mounted between the windshield channel in the extrusion and the glass so as to seal and cushion the windshield edge assembly.

Typical of boat windshield top edge or header extrusions shown in the prior art patent literature are the extrusions of U.S. Pat. Nos. 5,189,980; 4,993,351; 4,151,620; 3,172,419; 2,937,652 and U.S. Pat. No. Des. 324,368. These prior art extrusions are designed primarily for use along the top edge of the boat windshield, but numerous patents also exist which relate to boat windshield mounting extrusions that extend along the bottom edge of the windshield and mount the windshield to the deck of the boat. Typical of these patented bottom edge assemblies are the extrusions set forth in U.S. Pat. Nos. 5,269,250; 4,815,410; 4,750,449; 4,349,944; 3,978,353; 3,810,267; 3,654,648; 3,021,535 and 3,016,548.

In addition to the extrusions found in the patent literature, numerous top and bottom edge extrusions have been employed by leading boat windshield manufacturers. Typical of some of these commercially produced top edge extrusions are the extrusions shown in The Loxcreen Company, Inc. die drawings Nos. 9689, 9402, 9264, 7636, 7131 and 4340. Similar top edge assemblies have been commercially available through Water Bonnet Manufacturing.

In addition, every earlier boat windshield curved top edge assemblies have been extensively commercially used. Photographs showing a 1964 Century Resorter top edge windshield trim, for example, show a channel member which receives the top edge of the windshield and is secured by set screws into a slotted cylindrical pipe. The entire assembly is bent to match the curve of the top edge of the windshield.

Windshield top edge assemblies to which canvas or fabric canopies can be secured also have been commercially exploited for years. Photographs showing top edge assemblies on BAYLINER boats made in the 1960's in which the edge of the canvas is trapped in the top edge extrusion and in which a snap component is mounted to the top edge extrusion are well known.

Boat windshield top edge assemblies or extrusions perform several functions. They provide an aesthetic finish for the top edge of the windshield. They act as wear surfaces which prevent damage to the windshield, and they can be used for securement of canopies or Bimini tops to the windshield.

The prior art windshield top edge assemblies have been found to have certain limitations. Brushed and anodized aluminum can have a very nice appearance, but it would also be highly desirable to use other appearance enhancing materials, for example, stainless steel. To some degree plastics have been employed, but they lack the durability which would otherwise be desirable. Additionally, some of the windshield edge assemblies are highly reflective and can be a distraction to the boat driver under certain sun conditions. Finally, while aluminum has greater durability than plastics, unless very expensive and heat treated or electropolished aluminums are employed, they still do not have the durability and wear strength which would otherwise be desirable.

Accordingly, it is an object of the present invention to provide a windshield edge assembly and method of forming the same which is well suited for use as a top edge assembly for curved boat windshields.

Another object of the present invention is to provide a composite windshield edge assembly in which different materials can be employed and interlocked together during stretch forming of the windshield edge assembly into a curved configuration suitable for mounting on a boat windshield.

Another object of the present invention is to provide a windshield edge assembly having increased durability and aesthetic flexibility.

A further object is to provide a windshield -edge assembly and method which is more cost effective in its ability to incorporate expensive appearance enhancing materials, and have greater ease of manufacture.

Still a further object of the present invention is to provide a windshield edge assembly which is less reflective in the direction of the boat driver, can be used to secure Bimini top canopies, and is adaptable to a wide range of curved windshield edge configurations.

The windshield edge assembly and method of the present invention have other objects and features of advantage which will become apparent from and are set forth in more detail in, the accompanying drawing and following description of The Best Mode of Carrying Out the Invention.

DISCLOSURE OF THE INVENTION

The windshield edge assembly of the present invention is designed for stretch forming to fit on the edge of a curved boat windshield and comprises, briefly, an elongated base member having longitudinally extending legs defining a longitudinally extending windshield receiving channel and a longitudinally extending cap receiving structure; and an elongated cap member mounted on the cap receiving structure, of the base member. The cap member has a longitudinally extending first side edge and a longitudinally extending second side edge. The cap receiving structure and first and second side edges of the cap member are cooperatively formed to interlock against separation of the elements upon stretch forming of the base member and cap member together to a configuration for mounting on the edge of a curved windshield.

More particularly, the base member of the edge assembly preferably includes a clamping arm positioned on a second or concaved side of the assembly which is clamped down against the cap as the cap and base member are stretch formed about a curve. The convex or first side of the stretch formed extrusion and cap will automatically lock down and engage against a first shoulder provided on the base member. The base member preferably is an extruded aluminum member, with the cap being a roll formed stainless steel cap, or extruded aluminum cap, having an inverted U-shaped cross section. The side edges of the cap extend inwardly into recesses or channels provided along the front and rear facing sides of the top portion of the base extrusion.

In a second aspect of the present invention, a method of stretch forming an edge assembly for a curved windshield is provided which comprises, briefly, the steps of mounting a longitudinally extended cap member on a longitudinally extended base member having a windshield edge receiving channel therein; and stretch forming the cap member and base member while mounted together by longitudinally and arcuately plastically deforming the cap member and the base member by an amount and in a transversely curving direction producing tight interlocking engagement between the cap member and the base member. During the stretch forming step, a clamping arm on the base member preferably clamps down against the cap member to prevent the cap member from buckling out away from the base member on the concave side of the curved edge assembly.

BRIEF DESCRIPTION OF THE DRAWING

FIG. 1 is a fragmentary top perspective view of a boat having a curved windshield trimmed with a windshield edge assembly constructed in accordance with the present invention.

FIG. 2 is a greatly enlarged, end elevation view, in cross section of the windshield edge assembly of the present invention prior to mounting on a windshield and prior to stretch forming into a curved configuration.

FIG. 3 is an end elevation view, in cross section, corresponding to FIG. 2 and showing the edge assembly stretch formed into a curved configuration and mounted on a windshield with a fabric canopy shown mounted thereto in broken lines.

BEST MODE OF CARRYING OUT THE INVENTION

The windshield edge assembly of the present invention is particularly well suited for curved boat windshields of the type commonly found on high-performance ski and wakeboard boats, but it can be used in other applications, including non-marine applications. The edge assembly of the present invention has been designed for formation using stretch forming techniques, which are broadly well known and extensively used in the boat windshield manufacturing industry.

A typical curved boat windshield can be seen in FIG. 1 in which a high-performance boat 21 has a windshield 22 which is dramatically curved and swept. back along the sides of the cockpit of the boat. Mounted on top of the upper edge of the curved windshield is an edge assembly 23 constructed in accordance with the present invention. Also as may be seen, a lower extrusion or boat windshield mounting extrusion 24 is provided that is curved and used to mount the windshield to the deck 26 of boat 21. Briefly, such stretch forming processes include the steps of positioning a "snake" or elongated member in the windshield receiving channel of the extrusion to prevent its collapse during stretch forming.

Forming top edge assembly 23 to conform to the edge of swept back and curved windshield 22 is usually accomplished by employing a stretch forming process. The straight extrusion and snake will be gripped at its ends by hydraulic grippers and stretching longitudinally commenced which a curved die is brought into contact with the extrusion. The die has a configuration which essentially matches the upper edge of the curved windshield in FIG. 1. The extrusion is pulled or stretched and arcuately formed along the length of the die to plastically deform and elongate the extrusion. Typically, an 8 foot long straight extrusion will have its length increased by about 3 inches in the stretch forming or plastic deformation process.

The stretch forming process, briefly described above, is well known in the art and as thus far described does not contain novel subject matter.

FIGS. 2 and 3 better illustrate the unique boat windshield top edge assembly of the present invention. In FIG. 2, the top edge assembly is shown prior to stretch forming and prior to mounting of the same on a windshield edge, while in FIG. 3 the assembly has been stretch formed. The edge assembly of the present invention, generally designated 31, includes an elongated base member 32 having a longitudinally extending lower portion, generally designated 33, defining a windshield receiving channel 34, and a longitudinally extending upper portion, generally designated 36, defining a cap receiving structure, generally designated 37.

Base member 32 is preferably formed as an extrusion, most preferably an aluminum extrusion (for example, a 6063 aluminum). Cap 38 can be formed of a second material such as stainless steel, or it also can be formed from aluminum. Most preferably cap 38 is formed from roll formed stainless steel, but it can also be formed from an extruded and anodized aluminum (6063) or of a thermoplastic material. The two elements 32 and 38 are formed as separate members and then mounted together to produce the windshield edge assembly of FIG. 2. This is particularly advantageous in terms of cost effectiveness since it allows cap 38 to be a more expensive material, such as stainless steel or electropolished aluminum, without requiring that all of the assembly be formed of such high cost materials.

As will be seen in FIG. 2, there is a gap 39 between the base extrusion and the cap before the assembly is stretch formed. This gap or looseness allows the cap to be easily slid on the base extrusion 32 from one end. The flat surface or land 72 on upper portion 37 of the base extrusion also facilitates looseness for ease of assembly. The assembly of the cap and base extrusion, as shown in FIG. 2, is useful for use in stretch forming a windshield edge assembly to the edge of a curved boat windshield, and as such, the FIG. 2 assembly even before stretch forming comprises one aspect of the claimed invention.

While not mounted in the assembly of FIG. 2 during stretch forming, a gasket 41 is also shown for purposes of understanding. As used herein, the expression "windshield receiving channel" shall be understood to mean a channel which is formed and dimensioned to receive the edge of a windshield with a gasket, such as a vinyl gasket, mounted between the windshield and downwardly depending legs 43 defining channel 34.

As shown in FIG. 3 of the drawing, edge assembly 31 has been stretch formed to curve about a generally vertical axis curving to the left in FIG. 3. As used herein, therefore, the "first side" or the "front facing" side of the components comprising assembly 31 will be the convex or right side of FIGS. 2 and 3. The "second side" or "rear facing" side will be the concave or left side 46 of assembly 31. Obviously, the assembly could be curved to the right, and most typically the axis around which the windshield is curved will be inclined from the vertical and varying in its inclination to produce a complex twisting orientation matching the windshield edge.

It will be seen from FIG. 2, therefore, that elongated cap 38 has a first side edge 51 and a second side edge 52 which turn inwardly and are cooperatively formed to interlock with cap receiving structure 37 on base member 32 so as to interlock the cap member to the base extrusion during stretch forming. Cap receiving structure 37, therefore, can include longitudinally extending recesses or channels 56 and 57, with channel 56 having a shoulder 53 which extends longitudinally on first side 44 of the base member. Additionally, a longitudinally extending clamping arm 54 is provided on second side 46 of the base extrusion as part of the cap receiving structure 37. First cap side edge 51, therefore, interengages with first base shoulder 53 and clamping arm 54 clamps against second cap side edge 52 when base member 32 and cap 38 are stretch formed along a curve in which the convex side is first side 44 and the concave side is second side 46.

As will be seen from FIG. 2, cap member 38 has an inverted U-shaped cross section with inwardly projecting side edges 51 and 52. As cap member 38 is stretch formed along a left curving die, the cap on the convex first side 44 of the assembly will tend to clamp down automatically under first shoulder 53, as a result of longitudinal stretching and bending of the cap and base around a curved die surface. Arcuate arm 69 of the base member also will tend to close downwardly and reduce the opening to channel 56.

Second, side edge 52 of cap 38, however, would normally tend to open up on second side 46 of the assembly as it is being plastically deformed into a concave shape. Clamping arm 54, therefore, is important in preventing this natural tendency of the cap to open up as second side edge 52 is deformed to a concaved configuration. The stretch forming die on concave or second side 46 which is employed with the assembly of FIG. 2 is configured so as to urge arm 54 to the right to thereby be certain to trap side edge 52 against opening up. This movement of arm 54 can best be seen in FIG. 3 in which clamping arm 54 is shown in broken lines before it is stretch formed and is shown in solid lines after stretch forming. It will be noted that the radius of curvature $r_1$ of arcuate arm 54 is greater than the radius of curvature $r_2$ of the remainder of the cap receiving upper portion of extrusion 32. This is to enable arm 54 to be deformed inwardly during stretch forming to a position about equal in radius to $r_2$ in order to thereby trap the second side edge 52 of cap 38.

While the clamping arm 54 is shown in the embodiment of FIGS. 2 and 3 to be a part of upper portion 36 of base member 32, it will be understood that the arm could extend from leg 43 in the lower portion of the base member and clamp against second edge 52, particularly if the second edge 52 extended circumferentially around the upper portion 36 of the base extrusion to a pocket 57 which is lower than illustrated in the drawing. The essential feature is not whether the plastically deformable clamping arm 54 is provided on the upper portion 36 or the lower portion 33 but that it is provided in a position so as to clamp against the tendency to open up on the concave or second side 46 of the assembly.

Various configurations are suitable for use as a cap receiving structure on the upper portion of base extrusion. 32, but an arcuate structure, as shown in FIGS. 2 and 3, is advantageous for several reasons. First, many top edge extrusions on boat windshields have arcuate top surfaces for aesthetic reasons or to support canopies. Additionally, the stretch forming die will press down on the topmost surface (12 o'clock in FIGS. 2 and 3) during the forming process. Cap 38 must be supported on base 32 to avoid being crushed. This is also why land or planar surface 72 is to one side of the vertical plane or line of engagement of the cap by the stretch forming die.

As above noted, one of the substantial advantages of the assembly of FIGS. 2 and 3 is the ability to vary materials of the cap and base member so as to produce different aesthetic and strength effects. Most preferably, base member 32 is provided by an extruded member and cap member 38 is provided by one of an extruded member in a roll formed member. Thus, both the base and cap aluminum components, in which case cap 38 may advantageously be electro-polished and base 32 anodized to produce various aesthetic effects. The cap also can be heat treated to have higher strength. Thus the base extrusion can be a 6063 T1 extrusion while the cap a 6063 T5 extrusion.

The most preferred form of the present invention, however, is to roll form cap 38 from stainless steel. The stainless steel can be highly polished so as to give a nice visual effect, and it will have greater durability than an aluminum extrusion along the upper and front edge of the assembly. If cap 38 is highly reflective, it is preferred that it extend circumferentially or arcuately around cap receiving portion 37 to a position which is angularly elevated relative to a horizontal plane through center C. As shown in FIG. 2, therefore, cap 38 terminates above center C and reflections off of the highly reflective cap material are not as likely to distract the driver of the boat.

With respect to reflections, it is also further preferable that leg 43 on second side 46 of the assembly be formed with a convex surface 63 which also tends to reduce the glare or reflection back at the boat driver from the extrusion. The base extrusion also can be anodized to reduce glare and reflections.

Cap 38 also can be a non-metallic member, such as a thermoplastic extrusion. Such materials are less desirable in terms of wear, but they do afford a wide range of color options.

Turning now to FIG. 3, the effects of stretch forming on the assembly of FIG. 2 can be described. As will be seen in FIG. 3, cap 38 has been longitudinally and arcuately stretched so that it is now pulled down against the upper surface 66 of upper portion 36 of the base extrusion. The gap 39 in FIG. 2, therefore, is now gone in FIG. 3. Moreover, first side edge 51 is captured behind downwardly depending arm 69 which terminates in first shoulder 53. On concaved side 46 of the assembly, clamping arm 54 prevents side edge 52 from opening up and clamps the same against second shoulder 59. Together, the opposite inwardly extending side edges of the cap rigidly interlock with base extrusion 32 as a result of the stretch forming process. The flat or planar longitudinally extending section 72, which provides a gap 73 between the cap and base, also accommodates tolerance variations during the stretch forming and reduce friction between the two components to some degree during stretching.

Mounted in windshield receiving channel 34 between legs 43 of the base extrusion is a top edge 81 of curved windshield. As will be seen, gasket 41 is compressed into the gasket gripping ridges 82 formed in legs 43, and gasket 41 preferably has outwardly extending ridges 83 of its own which further ensure capturing of the gasket tightly between windshield upper edge 81 and legs 43. In the preferred method of assembly, gasket 41 is placed on the edge of the windshield and then the assembly is pressed into channel 34 between legs 43.

One of the optional features of the windshield edge assembly of the present invention that a canopy securement channel 64 can be provided. Channel 64 can cooperate with a canopy mounting clip 86, which reaches underneath the bottom edge 87 of front facing leg 43 of the extrusion and upwardly to channel 64. A snap assembly 88 can be provided with one of a male and female snap element on clip 86 and the other provided on the edge of canopy material 89. Canopy 89 then stretches up from the clip over the top of edge assembly 31 and back to a support structure mounted rearwardly of the windshield from the boat, usually at a position behind the cockpit. This canopy or Bimini top provides shade for the boat driver and passengers.

One of the advantages of the top edge assembly 31 of the present invention is that the front facing recess 56 also acts as a transverse water channel. Water which is sprayed up onto the front of the boat will be urged by the wind during boat motion to run up the front face of windshield 81 and onto top edge assembly 31, at which point it encounters transversely extending cap securement recess 56. Recess 56 acts as a water channel that extends around the windshield to deck 26, and channel 56 prevent, or at least minimizes, the amount of water which comes up over the top of the windshield, or at the sides of the windshield, and back into the boat and onto the driver and passengers. The channel 56 can be seen to remain open even after stretch forming so that it can accept and redirect water running up transversely and then down to deck 26 of the boat, rather than simply allowing it to pass over the top or around the sides of the windshield.

Having described the apparatus of the present invention, the method of forming an edge assembly for a curved windshield can be described. The present method includes a step of mounting a cap member 38 on a base member 32. The base member has a windshield edge receiving channel 34 and a cap receiving structure 37. The cap member is cooperatively formed to mount on the cap receiving structure provided on the base member. The additional step of the present invention is to stretch form cap member 38 and base member 32, while mounted together, by longitudinally and arcuately plastically deforming cap member 38 and base member 32 by an amount, and in a transverse curving direction, producing tight interlocking interengagement between the cap member and the base member. During the stretch forming step a longitudinally extending first side edge 51 of cap 38 on a convex side of the edge assembly becomes interlocked with a first shoulder 53 on the convex side of the base member, and a longitudinally extending clamping arm 54 on the concave side of the base member clamps against a longitudinally extending second side edge 52 of the cap member.

Cap member 38 is initially loosely mounted to base member 32 and becomes tightly interlocked on base member 32 during the stretch forming step. The stretch forming step is preferably accomplished using a die which urges longitudinally extending clamping arm 54 down against the cap member and particularly the cap's second side edge 52.

Prior to the mounting and stretch forming steps, the present method also preferably includes the step of extruding base member 32 to have a cap securement structure 37 on an upper portion thereof, and the step of forming the cap member with opposite side edges 51, 52 having a configuration to matingly engage with the cap securement structure. Most preferably, base members extruded from aluminum material and the cap member is roll formed from a stainless steel material. The present method also preferably includes the step of mounting edge assembly 31 on a mounting gasket 41 carried by the edge 81 of a curved windshield.

The process of the present invention produces a composite or two-piece, stretch formed, edge assembly that poses certain additional problems not found in single-piece extrusions of the type widely used in the prior art, namely, the is a problem of cutting the edge assembly to length. A single-piece extrusion, when stretch formed can simply be cut to the desired length with perpendicular or oblique cuts to match the curved windshield to be trimmed. The two-piece assembly of FIGS. 2 and 3, however, often will be formed of two dissimilar materials that must be cut to length at oblique angles. Cutting stainless steel as an oblique angle, for example, will almost certainly result in blade wonder and inaccurate cuts. Moreover, a transverse cut across the cross section of FIG. 3 which results after stretch forming can cause cap 38 to resiliently displace a short distance back along the base member 32. This can be a problem for both aluminum extrusions which are heat treated to different levels and stainless steel caps. In order to accommodate this releasing of the cap longitudinally, a two-step transverse cutoff process is employed.

Accordingly, in the preferred cutoff process, the stretch formed edge assembly is cut off with a release cut that is longer than the final desired product by a length sufficient to accommodate the jump back or release of cap 38. Typically, in an 8 foot length of curved stretch formed edge assembly, the jump back will be about one-half inch an aluminum extrusion cap and less for stainless steel. The first cut or release cut will be made one-half inch longer than the windshield and the cap allowed to displace or jump resiliently back to substantially the desired length. A second or finish cut to length of assembly 31 will then be performed.

Such transverse cutting to length can advantageously be performed by automated or robotic arm apparatus having two cutters, namely, a carbide aluminum cutter operating at, for example, 12,000 rpm and an abrasive cutting blade operating at about 5,000 rpm to cut the stainless steel cap.

The problem of blade wonder produced by oblique cuts of stainless steel or hardened aluminum is overcome in the method of the present invention by cutting edge assembly 31 by first entering the assembly by cutting base extrusion legs 43. This softer aluminum can be accurately cut at oblique angles without blade wonder, and when the higher speed aluminum blade reaches the stainless or high strength cap 38, the high speed aluminum cutting blade is removed and a lower speed abrasive cutting blade, with the same kerf or thickness, is inserted into the cut in legs 43. This cut is used as a guide to maintain the same angle of cut for the abrasive blade as it cuts through cap 38.

The method and apparatus of the present invention, therefore, produce a top edge assembly for a curved windshield having many aesthetic, strength and cost advantages as compared to currently employed systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A windshield edge assembly for stretch forming to fit on the edge of a curved windshield comprising:

an elongated base member having a pair of legs defining a longitudinally extending windshield receiving channel and having a longitudinally extending cap receiving structure;

an elongated cap member mounted on the cap receiving structure of the base member, the cap member having a longitudinally extending first side edge and a longitudinally extending second side edge; and the cap receiving structure and the first side edge and the second side edge being cooperatively formed to interlock the first side edge and the second side edge with the cap receiving structure against separation upon stretch forming of the base member and the cap member while mounted together.

2. The edge assembly as defined in claim 1 wherein, the cap receiving structure includes a longitudinally extending first shoulder on a first side of the base member, and a longitudinally extending side edge clamping arm on a second side of the base member, and wherein, the first side edge cooperatively interengages with the first shoulder and the clamping arm clamps against the second side edge when the base member and the cap member are stretch formed along a curve which is convex on the first side of the edge assembly and concave on the second side of the edge assembly.

3. The edge assembly as defined in claim 2 wherein, the first shoulder is provided by a longitudinally extending first recess in the base member positioned above the legs defining the windshield receiving channel.

4. The edge assembly as defined in claim 2 wherein, the clamping arm is provided by a longitudinally extending plastically deformable arm positioned to clamp the second side edge of the cap member against the base member during stretch forming.

5. The edge assembly as defined in claim 4 wherein, the clamping structure includes a longitudinally extending second shoulder on the second side of the base member proximate the clamping arm, and the clamping arm is positioned to clamp the second side edge against the second shoulder.

6. The edge assembly as defined in claim 5 wherein, the second shoulder and the clamping arm are provided by a longitudinally extending second recess in the base member positioned above the legs defining the windshield receiving channel.

7. The edge assembly as defined in claim 6 wherein, the second shoulder is provided by a longitudinally extending downwardly depending arm on the base member defining one side of an entrance to the second recess and the clamping arm is an upwardly extending arm on the base member defining the opposite side of the entrance to the second recess.

8. The edge assembly as defined in claim 7 wherein, the downwardly depending arm is arcuate and has a first radius of curvature, and the upwardly extending clamping arm is arcuate and has a second radius of curvature greater than the first radius of curvature.

9. The edge assembly as defined in claim 1 wherein, the base member is provided by an extruded member and the cap member is provided by one of an extruded member and a roll formed member.

10. The edge assembly as defined in claim 9 wherein, the base member and the cap member are both provided by extruded aluminum members.

11. The edge assembly as defined in claim 9 wherein, the base member is provided by an extruded aluminum member, and the cap member is provided by a roll formed stainless steel member.

12. The edge assembly as defined in claim 9 wherein, the cap member is provided by a non-metallic member.

13. The edge assembly as defined in claim 12 wherein, the cap member is provided by an extruded thermoplastic member.

14. The edge assembly as defined in claim 1 wherein, the elongated base member is formed with a longitudinally extending canopy channel in first side of the edge assembly formed for coupling of a canopy-mounting fitting to the base member.

15. The edge assembly as defined in claim 14 wherein, the canopy channel is formed in one of the legs defining the windshield receiving channel.

16. The edge assembly as defined in claim 1 wherein, the cap member has a cross section dimensioned to loosely mount on the cross section of the base member prior to stretch forming and dimensioned to tightly interlock against the base member after stretch forming.

17. An edge assembly for mounting on a curved windshield comprising:

an elongated base extrusion having a longitudinally extending lower portion defining a windshield receiving channel and a longitudinally extending upper portion defining a cap receiving structure; and an elongated cap member mounted over the cap receiving structure, the base extrusion and cap member having cooperatively interengaged longitudinally extending portions interlocked by plastic deformation during stretch forming of the extrusion and cap member together along a curved path.

18. The edge assembly as defined in claim 17 wherein, the upper portion of the base extrusion has a longitudinally extended first recess on a front-facing side thereof above the lower portion and a longitudinally extending second recess on a rear facing side thereof; and the cap portion is provided by a longitudinally extending inverted U-shaped cap member having opposite side edges of the U-shaped member extending into the first recess and the second recess, respectively.

19. The edge assembly as defined in claim 18 wherein, the first recess is defined in part by a longitudinally extending, downwardly depending first recess arm; and the side edge of the U-shaped cap member mounted in the first recess is upwardly formed to interlock with the downwardly depending first recess arm.

20. The edge assembly as defined in claim 18 wherein, the second recess is defined in part by a longitudinally extending, downwardly depending second recess arm and a longitudinally extending, upwardly extending clamping arm; and the side edge of the U-shaped cap member mounted in the second recess is interengaged with the base extrusion by being clamped by the clamping arm against the second recess arm.

21. The edge assembly as defined in claim 18 wherein, the upper portion of the base extrusion has an arcuate cross section with a planar portion over a substantial portion of the circumference of the upper portion at a position off a central vertical plane through the extrusion cross section, and the cap member is circular over substantially its entire circumferential length to be supported at the vertical plane and to define a space between the cap member and the planar portion facilitating stretch forming.

22. The edge assembly as defined in claim 17 wherein, the lower portion of the base extrusion includes a pair of downwardly depending longitudinally extending legs defining a windshield edge receiving channel, and the leg of the lower portion on the rear facing side of the base extrusion has a convexly formed rear facing surface.

23. The edge assembly as defined in claim 22 wherein, the leg of the lower portion on the front facing side of the base extrusion has a convexly formed front facing surface.

24. The edge assembly as defined in claim 17 wherein, the base extrusion is formed with a longitudinally extending front facing canopy securement channel.

25. The edge assembly as defined in claim 24 wherein, the canopy securement channel is formed in the lower portion of the base extrusion.

26. The edge assembly as defined in claim 17 wherein, the base extrusion is formed of aluminum, and the cap member is roll formed stainless steel.

27. The edge assembly as defined in claim 17 wherein, the base extrusion is formed of an anodized aluminum, and the cap member is extruded electro-polished aluminum.

28. The edge assembly as defined in claim 17 wherein, the cap member is an extruded thermoplastic member.

29. The edge assembly as defined in claim 17 wherein, the base extrusion has an exterior surface having relatively low reflectivity;
the cap member has a relatively highly reflective surface; and
the cap member is mounted to the base extrusion to extend circumferentially from a position below a horizontal plane passing through a center of the radius of curvature of the cap member on a front facing side of the base extrusion to a position above the horizontal plane passing through the rear facing side of the base extrusion.

30. The edge assembly as defined in claim 19 wherein, the first recess provides a transversely extending channel for the flow of water along the front facing side of the edge assembly to a position proximate a deck of a boat on which the edge assembly is mounted.

31. A method of forming an edge assembly for a curved windshield comprising the steps of:
mounting a longitudinally extending cap member on a longitudinally extending base member having a windshield edge receiving channel therein; and
stretch forming the cap member and base member while mounted together by longitudinally and arcuately plastically deforming the cap member and the base member by an amount and in a transversely curving direction producing tight interlocking interengagement between the cap member and the base member.

32. The method as defined in claim 31 wherein, during the stretch forming step a longitudinally extending first side of the cap member on a convex side of the edge assembly becomes interlocked with a first shoulder on the convex side of the base member, and a longitudinally extending clamping arm on the concaved side of the base member clamps against a longitudinally extruding second side of the cap member.

33. The method as defined in claim 32 wherein, the cap member is loosely mounted to the base member during the mounting step and becomes tightly interlocked on the base member during the stretch forming step.

34. The method as defined in claim 32 wherein, the stretch forming step is accomplished using a die formed to urge said clamping arm down against the cap member.

35. The method as defined in claim 31, and prior to said mounting step, the steps of:
extruding said base member to have a cap securement structure on an upper portion thereof; and
forming said cap member with opposite side edges having a configurated to matingly engage with the cap securement structure.

36. The method as defined in claim 35 wherein, the step of forming the cap member is accomplished by extruding the cap member.

37. The method as defined in claim 36 wherein, the steps of extruding said base member and extruding the cap member are both accomplished by extruding an aluminum material.

38. The method as defined in claim 36 wherein, the step of forming the cap member is accomplished by roll forming the cap member.

39. The method as defined in claim 38 wherein, the step of roll forming the cap is accomplished by roll forming a stainless steel strip of material.

40. The method as defined in claim 31, and the steps of:
after said stretch forming step, cutting transversely across the stretch formed edge assembly to thereby allow the cap member to resiliently displace along the edge assembly away from the cut end of the edge assembly, and
thereafter cutting the base member and cap member transversely again to a desired length for the edge assembly.

41. The method as defined in claim 40 wherein, the cutting steps are accomplished by cutting into the base member to produce a cut extending up to the cap member and then using the kerf of the cut as a guide for cutting the cap member.

42. The method as defined in claim 41 wherein, and the step of:
the step of cutting the base member up to the cap member is accomplished using one cutting blade operating at a first speed and the step of cutting cap member is accomplished using a second blade member operating at a second speed.

43. The method as defined in claim 31, and the step of:
mounting the edge assembly on a mounting gasket carried by the edge of a curved windshield.

44. The method as defined in claim 36 wherein, during the extruding step, forming the cap member as an inverted U-shaped member.

45. The method as defined in claim 38 wherein, during the roll forming step, forming the cap member as an inverted U-shaped member.

* * * * *